W. ROSS.
ICE CREAM DISHER.
APPLICATION FILED JUNE 1, 1915.
1,205,396.
Patented Nov. 21, 1916.
2 SHEETS—SHEET 1.
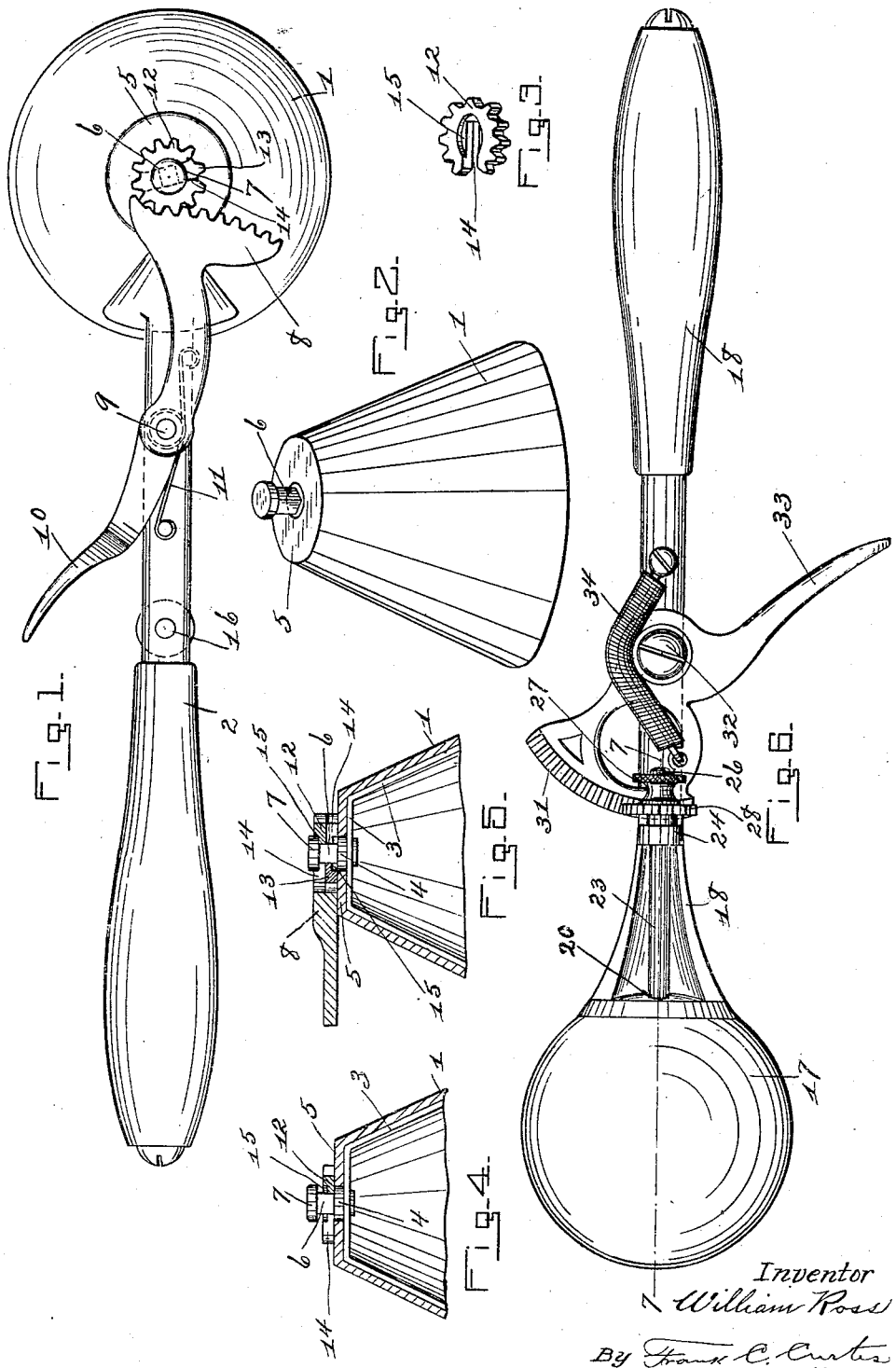
Inventor
William Ross
By Frank C. Curtis
Attorney

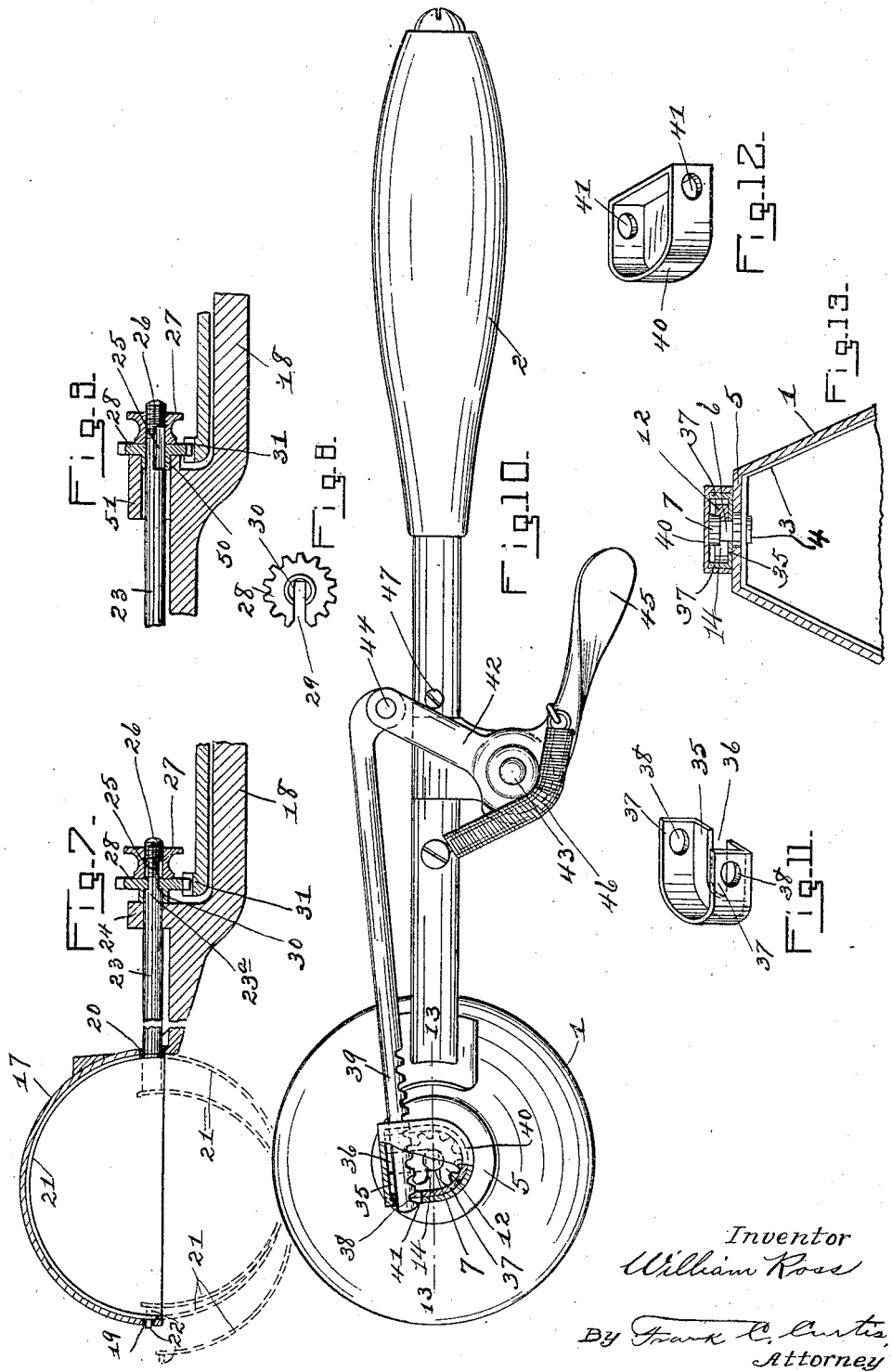
W. ROSS.
ICE CREAM DISHER.
APPLICATION FILED JUNE 1, 1915.
1,205,396.
Patented Nov. 21, 1916.
2 SHEETS—SHEET 2.
Inventor
William Ross
By Frank C. Curtis,
Attorney

UNITED STATES PATENT OFFICE.

WILLIAM ROSS, OF TROY, NEW YORK.

ICE-CREAM DISHER.

1,205,396.  Specification of Letters Patent.  Patented Nov. 21, 1916.

Application filed June 1, 1915. Serial No. 31,340.

*To all whom it may concern:*

Be it known that I, WILLIAM ROSS, a citizen of the United States, residing at Troy, county of Rensselaer, and State of New York, have invented certain new and useful Improvements in Ice-Cream Dishers, of which the following is a specification.

Reference may be had to the accompanying drawings, and the reference characters marked thereon, which form a part of this specification. Similar characters refer to similar parts in the several figures therein.

This invention is applicable to various forms of ice-cream spoons, dishers and the like.

Certain objects of the invention are to facilitate the removal for sanitary purposes, of the scraper whereby the body of cream or other plastic material being served is released from the bowl or cup of the device; to facilitate detachably mounting a pinion upon the scraper-shaft in such a device, or any similar shaft; and to insert and remove from the bowl of an ice-cream spoon the scraper and scraper-shaft.

Other objects will appear in connection with the following description.

Figure 1 of the drawings is a plan view showing my invention embodied in an ice-cream disher of the type having a cone-shaped cup. Fig. 2 is a view in perspective of the cone-shaped cup, showing the end of the scraper-shaft projecting through its bearing-aperture in the flattened end of the cone. Fig. 3 is a view in perspective of one of the laterally-slotted pinions whereby the scraper-shaft is held in its bearing in the flattened end of the cone-shaped cup and is also operatively connected with the gear-rack mounted on the handle of the device. Fig. 4 is a central, vertical section of the cone-shaped cup showing the scraper and scraper-shaft mounted therein with one of the pinions in engagement with the angular portion of the shaft. Fig. 5 is a similar view showing both pinions in engagement with the angular portion of the shaft and with the gear-rack which prevents the escape of the inner pinion from the shaft. Fig. 6 is a plan view showing my invention embodied in an ice-cream spoon having a semispherical bowl. Fig. 7 is a vertical, longitudinal section of the same taken on the broken line 7—7 in Fig. 6. Fig. 8 is a plan view of the slotted pinion used in the construction shown in Fig. 7. Fig. 9 is a similar sectional view of a modification of the construction shown in Fig. 7. Fig. 10 is a plan view showing my invention embodied in another form in an ice-cream disher having a cone-shaped cup. Fig. 11 is a view in perspective of a combined slideway for the gear-rack and keeper for the slotted pinion to hold the latter from longitudinal movement on the angular portion of the scraper-shaft in the construction shown in Fig. 10. Fig. 12 is a view in perspective in inverted position of the cap for inclosing the pinion and keeper shown in Fig. 10. Fig. 13 is a vertical section taken on the broken line 13—13 in Fig. 10.

Referring to Figs. 1 to 5 inclusive of the drawings, 1 is a cone-shaped cup fixed upon a handle, 2, within which cup is rotatively mounted a scraper, 3, fixed upon a shaft, 4, having a bearing in an aperture in the flattened end, 5, of the cup. The shaft, 4, projects out through said flattened end of the cup, being of a size adapted to be inserted and removed through the interior of the cup. On the outer side of its bearing-portion, the shaft, 4, has a portion, 6, angular in cross-section and of reduced diameter, and on the outer side of said angular portion said shaft terminates in a head, 7, of full diameter corresponding with the bearing-portion of the shaft. The scraper and scraper-shaft are adapted to be rotatively operated by engagement of a gear-rack, 8, with pinion-mechanism mounted upon the outwardly projecting portion of said shaft. The gear-rack, 8, is rotatively mounted at 9, upon the handle, 2, and is operated by means of a thumb-piece, 10, in a direction to cut out the contents from the bowl and in the return direction by a spring, 11. I have shown such pinion-mechanism in the form of two pinions, 12 and 13, preferably one a counterpart of the other, each provided with a laterally-open slot, 14, adapted to closely fit the angular portion, 6, of the scraper-shaft and to be slid onto and off from, as well as longitudinally of, said angular portion of the shaft, and each provided with a central countersink, 15, at the inner end of the slot, 14, which countersink is adapted to receive the head-portion, 7, of the scraper-shaft, 4. In assembling the pinion-mechanism, one of the pinions, as the pinion, 12, is slid sidewise onto the projecting angular portion, 6, of the scraper-shaft with its countersunk side uppermost, as shown in Fig. 4, and is then slid outwardly longitudinally of said angular portion until the head, 7, of the shaft is seated in the countersink, 15. The other pinion, 13, with either side uppermost is then slid upon the angular portion, 6, of the shaft between the pinion, 12, and the flattened end, 5, of the cup. The pinions are of such thickness that when thus placed upon the scraper-shaft, they substantially fill the space between the flattened end, 5, of the cup and the head, 7, on the shaft, and the escape of the outer pinion, 12, from the shaft is prevented by the occupation of its countersink, 15, by the head, 7, of the shaft. As the forming of the slot, 14, mutilates the toothed portion of the pinion, the lower pinion, 13, is preferably slid upon the shaft in a different direction from that in which the pinion, 12, is slid thereupon, whereby an unmutilated portion of each pinion is brought opposite the mutilated portion of the other. The gear-rack, 8, is preferably made of such thickness as to engage both pinions, 12 and 13; and in engaging the gear-rack with the pinions, the scraper-shaft and pinions are so rotatively adjusted that at no time during the limited movement of the gear-rack will the slot, 14, open directly toward the gear-rack. The movement of the gear-rack is limited by means of a thumb-screw, 16, located in the path of the thumb-piece, 10, which thumb-screw is unscrewed out of the path of the thumb-piece in engaging the gear-rack with, and disengaging it from, the pinions. When the parts are assembled as above described, the gear-rack will, while in engagement with the pinions, effectually prevent the escape from the scraper-shaft of the lower pinion, 13, which lower pinion acts as the keeper for the upper pinion as above described. As the essential function of the member, 13, is to act as a keeper for the pinion, 12, the teeth and countersink, 15, may be omitted from said member, 13, if desired. I prefer, however, to make the member, 13, a counterpart of the pinion, 12, whereby it is interchangeable therewith.

Referring to the construction shown in Figs. 6 to 8 inclusive, a semispherical bowl, 17, is fixed upon a handle, 18, said bowl being provided with a pair of bearing-apertures, 19 and 20, located diametrically opposite one another in line with the handle. The scraper, 21, is semicircular in form having on its outer end a trunnion, 22, rotatory in the bearing-aperture, 19, and having on its inner end a shaft, 23, rotatory in the bearing-aperture, 20, and also in an aperture in a bearing-lug, 24, on the handle. The shaft, 23, has near its outer end an angular portion, 25, of reduced diameter and terminates in a head, 26, of full diameter externally screw-threaded to receive a thumb-nut, 27. A pinion, 28, provided with a laterally-open slot, 29, and with a central countersink, 30, at the inner end of said slot, is adapted to be slid sidewise upon the angular portion 25, of the shaft, 23, and to be then slid longitudinally thereupon to seat in the countersink, 30, the body-portion, 23ª, of the shaft of full diameter adjacent to the inner end of said angular portion, in which position said pinion is secured by means of the thumb-nut, 27. The pinion, 28, and scraper-shaft and scraper are rotatively operated by engagement with said pinion of a toothed-rack, 31, pivoted at 32, upon the handle, 18, which rack is actuated in one direction by the thumb-piece, 33, and in the opposite direction by a coil-spring, 34. The scraper, 21, is preferably made of resilient metal permitting, when the scraper is rotated to project outwardly from the bowl, the outer end of the scraper to be sprung inwardly to release its trunnion, 22, from the bearing-aperture, 19, as indicated by dotted lines in Fig. 7; and the scraper-shaft 23, is adapted to be inserted and removed through the bowl when the pinion, 28, and thumb-nut, 27, are detached from the shaft, and after the trunnion, 22, has been sprung out of the bearing-apertures, 19 and 20, as above described. By thus making it possible to insert and remove the scraper and scraper-shaft through the bowl, it is necessary to provide only a close-fitting bearing-aperture, 20, for the shaft, which aperture is wholly inclosed by the inner surface of the bowl, leaving practically no openings in which the material being served can accumulate. In replacing the scraper and scraper-shaft, the end of the shaft is inserted from within the bowl outwardly through the bearing-aperture, 20, and through the bearing-aperture in the lug, 24, and the scraper is compressed until its trunnion, 22, can be sprung into the bearing-aperture, 19, after which the pinion, 28, and thumb-nut, 27, are applied to the shaft as above described.

In Fig. 9, I have have shown a modification of the construction shown in Fig. 7, in which I employ in place of the bearing-lug, 24, a bearing-lug, 51, on the handle, adapted to receive the hub, 50, of the pinion, 28, said hub being insertible within, and removable from, said bearing-lug by longitudinal sliding movement along the angular portion, 25, of the shaft, 23. The thumbnut, 27, holds the pinion with its hub so inserted in said bearing, in which position the pinion cannot escape from the shaft.

In Fig. 10, I have shown a disher having a cone-shaped cup, 1, handle, 2, scraper, 3, scraper-shaft, 4, with angular portion, 6, and head-portion, 7, and a pinion, 12, engageable with the shaft, all in the manner described above with reference to the construction shown in Fig. 1. As a keeper for the pinion, 12, in the construction shown in Fig. 10, however, I employ a plate, 35, provided with a slot, 36, which slot is adapted to fit the angular portion, 6, of the scraper-shaft, the thickness of said plate, 35, being sufficient, when it is inserted between the pinion, 12, and flattened end, 5, of the cup, to hold the pinion with the head, 7, of the shaft seated in the countersink, 15, of the pinion, whereby said plate serves to prevent the escape of the pinion from the shaft. The plate, 35, has on its opposite sides upturned flanges, 37, provided with slideway apertures, 38, adapted to receive a gear-rack, 39, and to hold said gear-rack in engagement with the pinion, 12, while the gear-rack at the same time prevents the keeper-plate, 35, from escaping from the scraper-shaft. The pinion and keeper-plate may be covered and inclosed by means of a cap, 40, provided with apertures, 41, adapted to register with the apertures, 38, in the flanges of the keeper-plate through which apertures, 41, the gear-rack, 39, extends, thus serving to hold the cap, 40, in position. The gear-rack, 39, is operated by means of an angle-lever, 42, fulcrumed at 43, upon the handle, 2, and pivotally connected with the gear-rack at 39, said gear-rack being operated in one direction by a thumb-piece, 45, and in the opposite direction by a coil-spring, 46, such spring-actuated movement being limited by a screw, 47, in the path of the angle-lever, 42. When the screw, 47, is removed from its path, the angle-lever can be rotated sufficiently to withdraw the rack, 39, from the cap, 40, thus releasing said cap, and the keeper-plate, the latter when removed releasing the pinion, 12.

Any known means may be employed in place of the pinion, 13, thumb-nut, 27, and keeper-plate, 35, to prevent such longitudinal sliding movement of the pinion, 12 or 28, upon the angular portion of the scraper-shaft as would permit said pinion, 12 or 28, to be slid transversely off from the shaft.

What I claim as new and desire to secure by Letters Patent is:

1. In a device of the class described, and in combination, a pair of elements comprising a support and a shaft rotatively mounted with respect to said support, said shaft having a portion angular in cross-section; a pinion provided with a laterally-open slot slidable transversely onto and off from, and longitudinally of, said angular portion of the shaft, said pinion and one of said elements having parts interengageable by longitudinal sliding movement of the pinion to prevent transverse movement thereof; and means for holding the pinion from longitudinal sliding movement with said parts interengaged.

2. In a device of the class described, and in combination, a shaft having a portion angular in cross-section; a pinion provided with a laterally-open slot slidable transversely onto and off from, and longitudinally of, said angular portion of the shaft, said pinion and shaft having parts interengageable by longitudinal sliding movement of the pinion to prevent transverse movement thereof; and means for holding the pinion from longitudinal sliding movement with said parts interengaged.

3. In a device of the class described, and in combination, a shaft having a portion angular in cross-section and adjacent thereto a portion of larger cross-section dimensions than said angular portion; a pinion provided with a laterally-open slot slidable transversely onto and off from, and longitudinally of, said angular portion of the shaft, and with a countersink at the inner end of said slot adapted to receive the said portion of the shaft of larger dimensions; and means for holding said pinion from movement longitudinally of the angular portion of the shaft with said countersink occupied by said portion of the shaft of larger dimensions.

4. In a device of the class described, and in combination, a shaft having a portion angular in cross-section and adjacent thereto a portion of larger cross-sectional dimensions than said angular portion; a pinion provided with a laterally-open slot slidable transversely onto and off from, and longitudinally of, said angular portion of the shaft, and with a countersink at the inner end of said slot adapted to receive the said portion of the shaft of larger dimensions; and a keeper mounted on said shaft for holding said pinion from movement longitudinally of the angular portion of the shaft with said countersink occupied by said portion of the shaft of larger dimensions.

5. A device of the class described having in combination, a semispherical bowl provided with diametrically-opposite bearing-apertures; a semicircular resilient scraper loosely fitting within the bowl and having fixed on one of its ends a shaft insertible in, and withdrawable from, one of said apertures, through the bowl, and having on its other end a trunnion insertible in, and withdrawable from, the other of said bearing-apertures by compression of the scraper, said pinion having a portion angular in cross-section projecting outside the bowl; a handle having a bearing-support; a pinion provided with a laterally-open slot slidable transversely onto and off from, and longitudinally of, said angular portion of the shaft, said pinion and shaft having parts interengageable by longitudinal sliding movement of the pinion to prevent transverse movement thereof; and means for holding the pinion from longitudinal sliding movement with said parts interengaged.

In testimony whereof, I have hereunto set my hand this 26th day of May, 1915.

WILLIAM ROSS.

Copies of this patent may be obtained for five cents each, by addressing the "Commissioner of Patents, Washington, D. C."